US 011474816 B2

(12) United States Patent
Hicks et al.

(10) Patent No.: US 11,474,816 B2
(45) Date of Patent: Oct. 18, 2022

(54) CODE REVIEW USING QUANTITATIVE LINGUISTICS

(71) Applicant: International Business Machines Corporation, Armonk, NY (US)

(72) Inventors: Andrew C. M. Hicks, Wappingers Falls, NY (US); Robert Peter Catalano, Montgomery, NY (US); Tyler Vezio Rimaldi, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/102,863

(22) Filed: Nov. 24, 2020

(65) Prior Publication Data
US 2022/0164182 A1    May 26, 2022

(51) Int. Cl.
*G06F 8/73* (2018.01)
*G06Q 30/04* (2012.01)
*G06F 11/36* (2006.01)

(52) U.S. Cl.
CPC .......... *G06F 8/73* (2013.01); *G06F 11/36* (2013.01); *G06Q 30/04* (2013.01)

(58) Field of Classification Search
CPC .......... G06F 8/73; G06F 11/36; G06Q 30/04
See application file for complete search history.

(56) References Cited

U.S. PATENT DOCUMENTS

| | | | |
|---|---|---|---|
| 6,446,062 B1 * | 9/2002 | Levine | G06F 16/252 707/690 |
| 7,552,361 B2 | 6/2009 | Galler et al. | |
| 7,603,664 B2 | 10/2009 | Dutt et al. | |
| 8,307,351 B2 | 11/2012 | Weigert | |
| 8,850,410 B2 | 9/2014 | Burugula et al. | |
| 8,881,122 B1 * | 11/2014 | Klimek | G06F 8/427 717/144 |
| 9,032,369 B2 | 5/2015 | Balakrishnan et al. | |
| 10,068,093 B2 * | 9/2018 | Brucker | G06F 11/3604 |
| 10,635,566 B1 | 4/2020 | Talluri et al. | |
| 11,005,504 B2 * | 5/2021 | Chen | H03M 13/618 |
| 2001/0054026 A1 * | 12/2001 | Choate | G06F 11/3409 705/52 |
| 2006/0195350 A1 | 8/2006 | Miyano | |
| 2007/0088986 A1 | 4/2007 | Stark et al. | |
| 2011/0145793 A1 * | 6/2011 | Alexander | G06F 11/368 717/124 |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Qing Chen
*Assistant Examiner* — Amir Soltanzadeh
(74) *Attorney, Agent, or Firm* — Stosch Sabo

(57) ABSTRACT

Described are techniques for code review using Quantitative Linguistics (QL). The techniques include comparing received code to one or more repositories of code and identifying one or more portions of rare code in the received code that satisfy a rarity threshold relative to the one or more repositories of code. The techniques further include generating annotated code by annotating the received code at the one or more portions of rare code and transmitting the annotated code to a testing platform.

14 Claims, 7 Drawing Sheets

(56) References Cited

U.S. PATENT DOCUMENTS

| | | | | |
|---|---|---|---|---|
| 2011/0321007 A1* | 12/2011 | Marum | ............... | G06F 8/65 |
| | | | | 717/113 |
| 2013/0198499 A1* | 8/2013 | Dice | ............... | G06F 9/3846 |
| | | | | 712/239 |
| 2014/0157239 A1* | 6/2014 | Goetsch | ............... | G06F 11/3604 |
| | | | | 717/126 |
| 2015/0378871 A1* | 12/2015 | Asthana | ............... | G06F 11/3628 |
| | | | | 717/122 |
| 2016/0378445 A1* | 12/2016 | Kashiwagi | ............... | G06F 8/77 |
| | | | | 717/143 |
| 2018/0101464 A1* | 4/2018 | Fan | ............... | G06F 11/3608 |
| 2020/0065227 A1* | 2/2020 | Gao | ............... | G06F 11/36 |

* cited by examiner

CODE REVIEW USING QUANTITATIVE LINGUISTICS

BACKGROUND

The present disclosure relates to automated code review, and, more specifically, to automated code review using quantitative linguistics (QL).

Code review is a quality assurance activity used in software, firmware, and/or other code development. Code review can be used to identify defects (e.g., bugs, errors, inaccurate performance, etc.) and/or to improve code quality (e.g., improve robustness, improve efficiency, improve maintainability, etc.).

SUMMARY

Aspects of the present disclosure are directed toward a computer-implemented method comprising comparing received code to one or more repositories of code. The method further comprises identifying one or more portions of rare code in the received code that satisfy a rarity threshold relative to the one or more repositories of code. The method further comprises generating annotated code by annotating the received code at the one or more portions of rare code. The method further comprises transmitting the annotated code to a testing platform.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
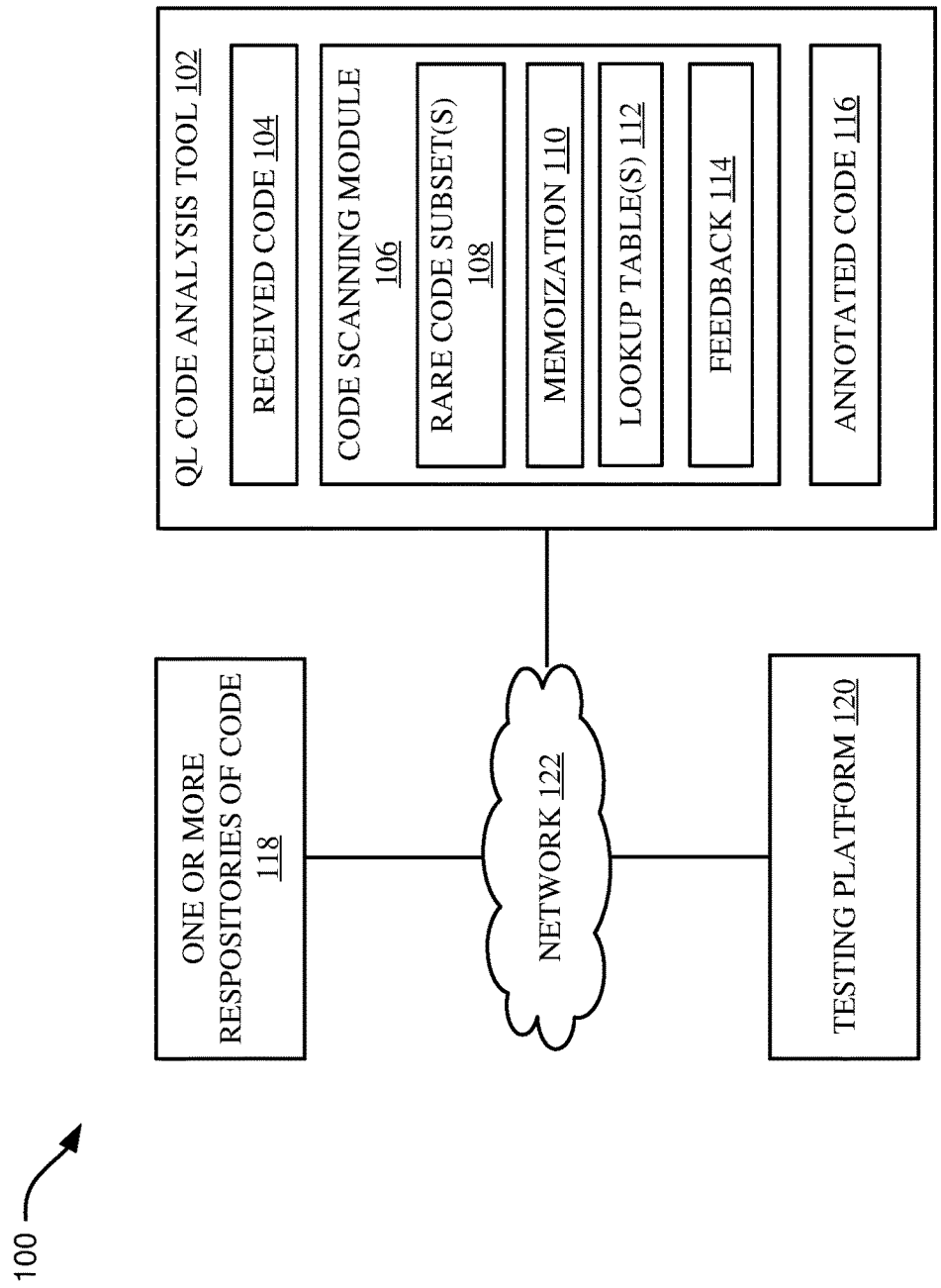
FIG. 1 illustrates a block diagram of an example computational environment including a Quantitative Linguistics (QL) code analysis tool, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward automated code review, and, more specifically, to automated code review using Quantitative Linguistics (QL). While not limited to such applications, embodiments of the present disclosure may be better understood in light of the aforementioned context.

Software continues to become more ubiquitous. Tasks that were previously performed manually are increasingly being automated using software. Furthermore, previous tasks that were automated are often rebuilt to increase functionality, performance, and/or efficiency. Accordingly, both the volume of software projects and the sizes of individual software projects are growing.

As the volume and sizes of software projects increase, there is increasing risk for errors in the developed code. For example, software may be developed using proprietary or low-level programming code that is relatively unknown. As another example, the sheer size of some software projects makes it difficult to detect errors. Finally, the size and volume of software projects increasingly makes it impractical for programmers to perform manual code reviews.

To address the inefficiencies of manual code reviews, software can be used to automate some aspects of code review. Automated code review can check source code for compliance with various requirements and/or best practices. In some situations, automated code review can evaluate code and display warnings associated with violations of programming standards, bugs, suspicious constructs, and/or stylistic errors.

However, the nature of automated code review can leave some programming errors undetected. For example, consider the theoretical code in Table 1:

TABLE 1

THEORETICAL CODE WITH ERROR

```
while (!jobFuture.isDone( )) {
  Thread.sleep(1000) // 1 second
  List<Integer> jobIds = jobFuture.jobIds( );
  if (jobIds.isEmpty( )) {
    continue; /* POTENTIAL BUG CATCH HERE */
  }
  int currentJobId = jobIds.get(jobIds.size( ) - 1);
  SparkJobInfo jobInfo = jsc.statusTracker( ).getJobInfo(currentJobId);
  SparkStageInfo stageInfo =
  jsc.statusTracker( ).getStageInfo(jobInfo.stageIds( )[0]);
  System.out.println(stageInfo.numTasks( ) + " tasks total: " +
  stageInfo.numActiveTasks( ) + " active, " +
  stageInfo.numCompletedTasks( ) + "complete");
}
```

As shown in Table 1, the "/*POTENTIAL BUG CATCH HERE*/" on the fifth line represents a hypothetical coding error that may not be caught using traditional manual code review or automated code review. For example, the continue statement in the fifth line is useless since if jobIds.is Empty( ) is true or false, the code executes in a similar manner. In other words, coding errors as shown above may not be detected during function testing since they remain executable.

Accordingly, there is a need to develop automated code review tools capable of catching errors beyond explicit programmatic errors and/or syntax errors. Such an improvement can result in a code review tool that is more efficient (e.g., due to its automated nature), and more accurate (due to the greater variety of errors it can detect).

Aspects of the present disclosure are directed toward improved automated code review tools. Aspects of the present disclosure utilize QL together with Hapax Legomenon and Zipf's Law to accurately and efficiently identify potentially problematic portions of source code. Hapax Legomenon refers to a word that occurs only once within a context (e.g., once within a designated text, once within a designated corpus, once within a designated language, etc.). Zipf's Law is an empirical law of QL whereby a variety of data can be approximated with a type of power law probability distribution known as a Zipfian distribution. As it relates to the Hapax Legomenon, Zipf's law states that the frequency of a word within a context is inversely proportional to its rank in a corresponding frequency table associated with the context. Said another way, the most frequent word in a context will occur approximately twice as often as the second most frequent word, three times as often as the third most frequent word, and so on. As it relates to code review, QL, Hapax Legomenon, and Zipf's Law suggest that a portion of code that is increasingly rare is also increasingly likely to be an error, and a portion of code that does not appear in any other portion of code in one or more repositories of similar code (e.g., Hapax Legomenon) is very likely to be an error.

Aspects of the present disclosure involve comparing received code to one or more repositories of code and identifying one or more portions of rare code in the received code that satisfy a rarity threshold relative to the one or more repositories of code. A portion of code can refer to a word, phrase, operation, sequence, bundle, module, or other portion of code. A portion of rare code that satisfies a rarity threshold can refer to a portion of code that does not appear in one or more repositories of code (e.g., Hapax Legomenon), or a portion of code that appears sufficiently infrequently in one or more repositories of code (e.g., only appears three or fewer times in the one or more repositories of code, is in a bottom 1% of a Zipfian distribution of the one or more repositories of code, etc.). In some embodiments, identifying portions of rare code can utilize memoization (e.g., the use of cached results) to accelerate the identification of portions of rare code. Memoization can enable the identification of portions of rare code to occur in approximately real-time. In some embodiments, identifying portions of rare code can use lookup tables (e.g., prepopulated tables of portions of code in one or more repositories of code) to accelerate the identification of portions of rare code.

In some embodiments, the present disclosure further generates annotated code by annotating the received code at the one or more portions of rare code. In some embodiments, the annotation can be performed by marking the one or more portions of rare code (e.g., highlighting, commenting, flagging, editing, redlining, annotating, tagging, etc.). In some embodiments, a new branch associated with the received code is created and the one or more portions of rare code are marked in the new branch.

In some embodiments, the present disclosure further includes transmitting the annotated code to a testing platform. The testing platform can utilize additional code review tools (automated and/or manual) to evaluate the annotated portions of rare code. For example, the testing platform can include a subject matter expert (SME) in the given coding language, where the SME can review, approve, modify, or otherwise comment on the annotated portions of rare code.

Finally, in some embodiments, aspects of the present disclosure can involve receiving feedback and modifying the rare code detection model using the received feedback. For example, for embodiments utilizing lookup tables, a portion of code identified as rare code that is not, in fact, rare code (e.g., a false positive), can be added to the lookup table.

Accordingly, aspects of the present disclosure can realize improved efficiency due to automated code review, and, more specifically, increased efficiency relative to other automated code review tools by the use of (i) QL, (ii) memoization and/or (iii) lookup tables. Regarding (i), using QL realizes computational improvements over other automated code review tools insofar as it is more computationally efficient to infer programmatic errors from QL rather than directly identify programmatic errors by monitoring execution and/or relying upon preprogrammed rules to test for code integrity. Furthermore, using QL to infer programmatic errors in code overcomes some of the specific shortcomings of execution-based automated code review. For example, returning to the example provided in Table 1, aspects of the present disclosure can correctly identify the potential bug indicated in the fifth line using QL in relation to statistical mappings of the source code. In other words, regardless of whether or not the code remains executable, aspects of the present disclosure can detect erroneous code by virtue of QL.

Regarding (ii), the use of memoization increases computational efficiency by keeping previously or frequently accessed results cached and quickly retrievable. Thus, aspects of the present disclosure can exhibit improved processing speed relative to other code review tools that may attempt to identify rare portions of code.

Regarding (iii), the use of lookup tables increases computational performance by storing portions of code from a corpus of code in lookup tables, where the lookup tables can be used to efficiently identify matches (if any) with portions of code undergoing code review. In some embodiments, memoization utilizes lookup tables in the aforementioned configuration or in another configuration (e.g., for caching historical results for quick access).

Referring now to the figures, FIG. 1 illustrates a block diagram of an example computational environment 100 including a QL code analysis tool 102 communicatively coupled to one or more repositories of code 118 and a testing platform 120 via a network 122, in accordance with some embodiments of the present disclosure.

The QL code analysis tool 102 can be a desktop, laptop, handheld device, smartphone, tablet, computer, server, or another physical or virtual configuration of hardware and/or software. The QL code analysis tool 102 can include received code 104, where the received code 104 can be software code, firmware code, source code, programming code, or any other code written in any coding language now known or later developed. In some embodiments, the received code 104 is provided to the QL code analysis tool 102 for code review. The code scanning module 106 can perform automated code review on the received code 104. The code scanning module 106 can identify one or more rare code subsets 108 of the received code 104 relative to the one or more repositories of code 118. Rare code subsets 108 can be words, phrases, operations, sequences, bundles, modules, or any other subset of the received code 104 that do not appear in the one or more repositories of code 118 or appear sufficiently infrequently in the one or more repositories of code 118. The one or more repositories of code 118 can include a corpus of programming code. In some embodiments, the one or more repositories of code 118 includes code written in a same coding language as the received code 104.

When identifying the rare code subsets 108, the code scanning module 106 can utilize memoization 110. Memoization 110 refers to a computing technique for accelerating computer programs by storing results of expensive functional calls and returning the cached result when the same inputs occur again. For example, a first portion of the received code 104 can return a match result to a portion of code in the one or more repositories of code 118 and the match result can be cached. A second portion of the received code 104 that is identical to the first portion of the received code 104 can retrieve the cached match result rather than scanning the entirety of the one or more repositories of code 118 for a match. Accordingly, memoization 110 can improve performance by accelerating the speed at which QL code analysis tool 102 can analyze code. In some embodiments, the QL code analysis tool 102 can analyze code in real-time (e.g., as it is being written).

In some embodiments, lookup tables 112 store cached results, such as the cached match result discussed in the example above regarding memoization 110. In other embodiments, lookup tables 112 store respective portions of the one or more repositories of code 118 as a separate instance. In some embodiments, the lookup tables 112 also store, in each instance, a frequency indicator corresponding to the respective portion of the one or more repositories of code 118. The frequency indicator can be a number of times the respective portion appears in the one or more repositories of code 118, a rank of how frequent the respective portion appears in the one or more repositories of code 118 relative to other portions, or a different metric. The code scanning module 106 can then compare each portion of the received code 104 to the portions of the one or more repositories of code 118 stored in the lookup tables 112 in an attempt to identify rare code subsets 108 in the received code. The rare code subsets 108 can be portions of the received code 104 that do not match any portion stored in any instance of the lookup table 112, or the rare code subsets 108 can be portions of the received code that match a portion of code stored in the lookup table 112 with a frequency indicator that is sufficiently infrequent (e.g., below a certain number appearances in the one or more repositories of code 118, a rank in a most infrequent 1% of the lookup table 112, etc.).

Code scanning module 106 can generate annotated code 116. Annotated code 116 can be a version of the received code 104 that includes indications of the rare code subsets 108 identified by the code scanning module 106. For example, the annotated code 116 can include a new branch (e.g., using a Git checkout command, or any equivalent version control operative) with highlighting, commenting, flagging, editing, redlining, annotating, tagging, or another technique for marking added at the rare code subsets 108.

QL code analysis tool 102 can be configured to send the annotated code 116 to a testing platform 120. The testing platform 120 can evaluate the rare code subsets 108 identified in the annotated code 116 for potential errors. In some embodiments, the testing platform 120 constitutes additional manual and/or automated code review tools. In some embodiments, the testing platform 120 is a code review application administered by a subject matter export (SME).

Code scanning module 106 can further include feedback 114. Feedback 114 can be received from the testing platform 120 after the annotated code 116 is provided to the testing platform 120. Feedback 114 can indicate accurate and/or inaccurate portions of the annotated code 116. For example, feedback 114 can identify a rare code subset 108 within the annotated code 116 that is, in fact, acceptable code (e.g., a false positive). In such situations, the identified rare code subset 108 can be added to the lookup table 112 so that future implementations of the code scanning module 106 do not interpret the identified rare code subset 108 to be potentially erroneous or anomalous code.

Network 122 can be a permanent, semi-permanent, or intermittent network that continuously or intermittently connects two or more of the QL code analysis tool 102, the one or more repositories of code 118, and/or the testing platform 120. The network 122 can be a wide area network (WAN), local area network (LAN), personal area network (PAN), or another type of network. In some embodiments, the network 122 is the Internet or an intranet.

Although QL code analysis tool 102 is shown as communicatively coupled to the one or more repositories of code 118 and the testing platform 120 by the network 122, in other embodiments, two or more of the aforementioned components are incorporated into a single component. Furthermore, in some embodiments, QL code analysis tool 102 is a service provisioned to a client device.

Figure 2:
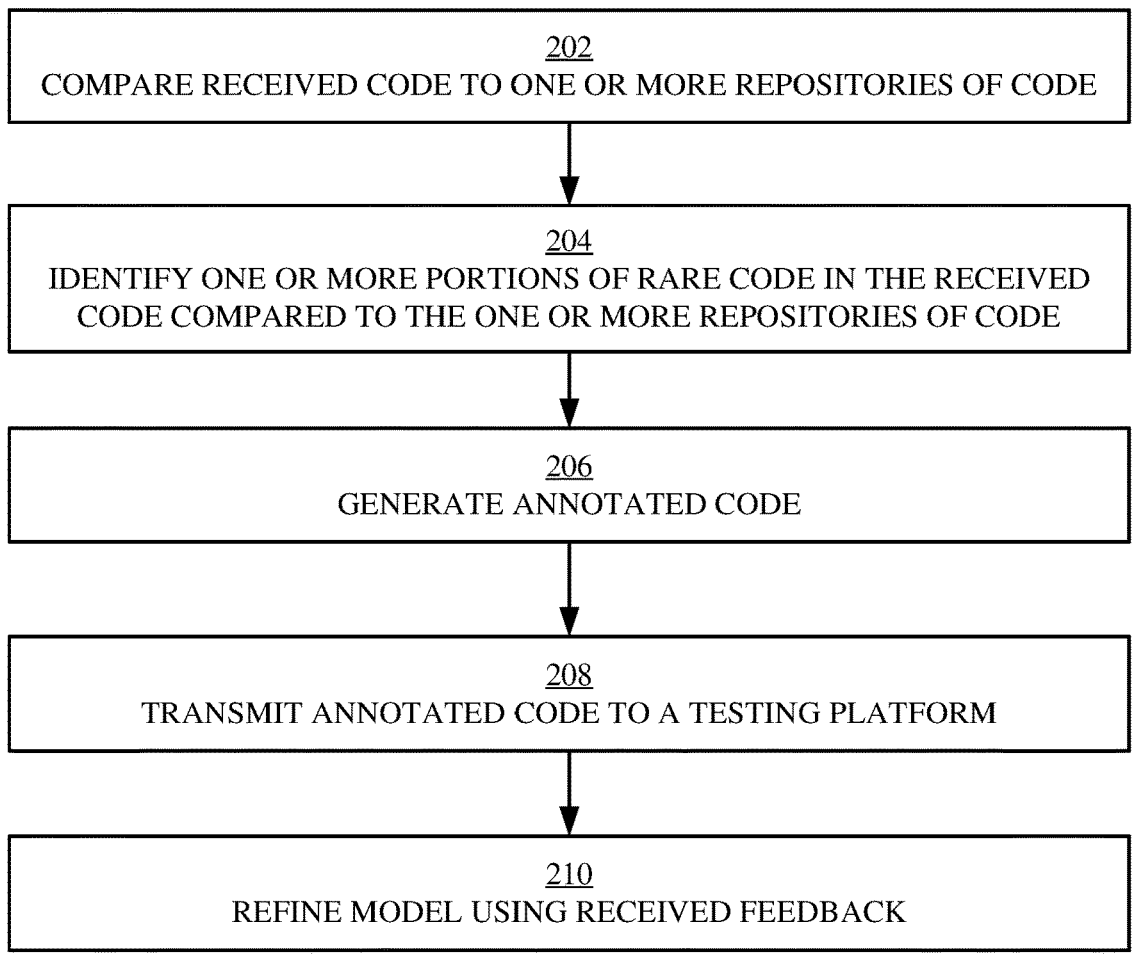
FIG. 2 illustrates a flowchart of an example method for utilizing a QL code analysis tool, in accordance with some embodiments of the present disclosure.

FIG. 2 illustrates a flowchart of an example method 200 for utilizing a QL code analysis tool, in accordance with some embodiments of the present disclosure. In some embodiments, the method 200 is implemented by a server, a computer, a processor, a virtual machine, the QL code analysis tool 102 of FIG. 1, or another configuration of hardware and/or software.

Operation 202 includes comparing received code to one or more repositories of code. The received code can be source code for code review. The one or more repositories of code can be a corpus of code in a similar programming language as the received code. Operation 202 can be implemented to detect matches between portions of the received code and portions of the one or more repositories of code.

Operation 204 includes identifying one or more portions of rare code in the received code compared to the one or more repositories of code. Rare code can be (i) a portion of the received code that does not match any portion of the one or more repositories of code, or (ii) a portion of the received code that matches a portion of the one or more repositories of code, where the matching portion of the one or more repositories of code is associated with a frequency in the one or more repositories of code below a frequency threshold.

The frequency can be a number of times the matching portion of the one or more repositories of code appears in the one or more repositories of code or a percentile rank indicating the frequency of the matching portion of the one or more repositories of code relative to other portions of the one or more repositories of code. For example, a frequency threshold based on a number of times can be two. In such an example, any portion of received code that matches a portion of the one or more repositories of code that appears less than two times can be characterized as rare code. As another example, a frequency threshold based on a percentile rank can be 99%. In such an example, any portion of received code that matches a portion of the one or more repositories of code that appears a number of times that falls between the 99th percentile and 100th percentile can be characterized as rare code (where the 1st percentile is a most common portion of code and the 100th percentile is a least common portion of code).

In some embodiments, operation 204 utilizes memoization and/or lookup tables to accelerate identifying the one or more portions of rare code in the received code. In some embodiments, operation 204 occurs in approximately real-time (e.g., as the code is being developed). Operation 204 is discussed in more detail hereinafter with respect to FIGS. 3A and 3B.

Operation 206 includes annotating the received code to generate annotated code. The annotated code includes indications of the one or more portions of rare code identified in operation 204. Operation 206 is discussed in more detail hereinafter with respect to FIG. 4A.

Operation 208 includes transmitting the annotated code to a testing platform. The testing platform can include automated or manual code review tools for investigating the rare portions of code that are identified in the annotated code. Rare portions of code have a high likelihood of including errors, mistakes, bugs, and/or other problems. In some embodiments, the testing platform includes a SME review of the rare portions of code.

Operation 210 includes refining a code scanning module of the QL code review tool using received feedback. In some embodiments, feedback indicating accurate and/or inaccurate identification of rare code is received. In embodiments utilizing lookup tables, the lookup tables can be updated based on the feedback. For example, feedback can indicate that an identified portion of rare code was not, in fact, erroneous or problematic (e.g., a false positive). In such a situation, aspects of the present disclosure can add the incorrectly identified code to a lookup table so that the incorrectly identified code is not characterized as rare code in the future.

Figure 3A:
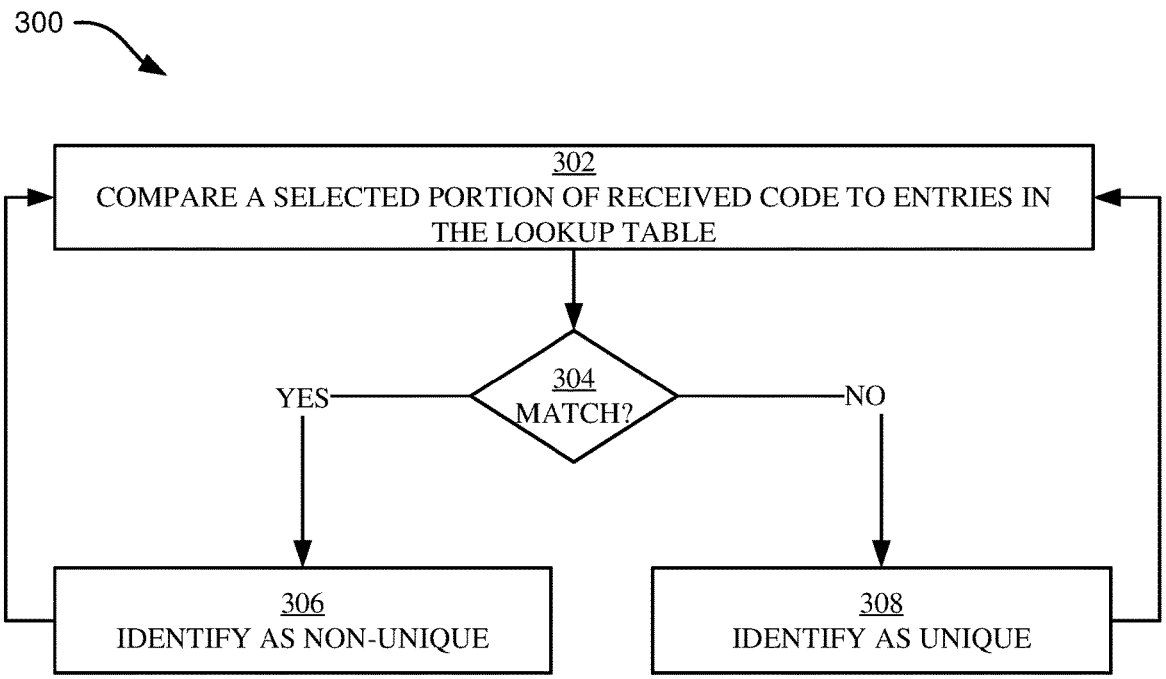
FIG. 3A illustrates a flowchart of an example method for binary classification of portions of code as unique or non-unique based on QL, in accordance with some embodiments of the present disclosure.

FIG. 3A illustrates a flowchart of an example method 300 for binary classification of portions of code as unique or non-unique based on QL, in accordance with some embodiments of the present disclosure. In some embodiments, the method 300 is implemented by a server, a computer, a processor, a virtual machine, the QL code analysis tool 102 of FIG. 1, or another configuration of hardware and/or software. In some embodiments, the method 300 is a sub-method of operation 204 of FIG. 2.

Operation 302 includes comparing a selected portion of received code to entries in a lookup table, where the entries in the lookup table correspond to portions of code in the one or more repositories of code. Operation 304 includes determining if there is a match between the selected portion of the received code and any entry in the lookup table. If so, (304: YES), then the method 300 proceeds to operation 306 and characterizes the selected portion of code as non-unique (e.g., not rare) before returning to operation 302 and selecting another portion of the received code. If not, (304: NO), then the method 300 proceeds to operation 308 and characterizes the selected portion of code as unique (e.g., rare) before returning to operation 302 and selecting another portion of the received code.

As can be seen in FIG. 3A, the method 300 makes binary classifications for each portion of the received code, where the binary classifications can indicate each portion of code is not rare (e.g., non-unique) or rare (e.g., unique). Using binary classifications can identify only those portions of the received code as rare that do not appear anywhere in the one or more repositories of code (e.g., hapax legomenon). Thus, the method 300 exhibits a computationally inexpensive way to identify rare portions of code that may correspond to errors through the use of binary classifications, memoization, and/or lookup tables.

Figure 3B:
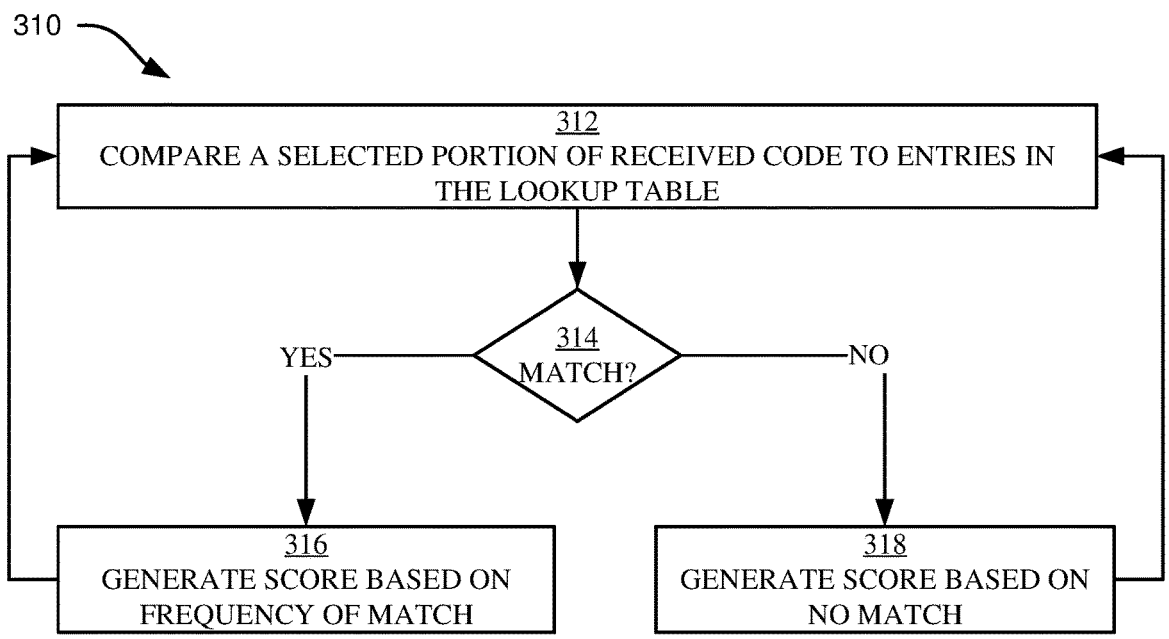
FIG. 3B illustrates a flowchart of an example method for scoring portions of code for uniqueness based on QL, in accordance with some embodiments of the present disclosure.

FIG. 3B illustrates a flowchart of an example method 310 for scoring portions of code for uniqueness based on QL, in accordance with some embodiments of the present disclosure. In some embodiments, the method 310 is implemented by a server, a computer, a processor, a virtual machine, the QL code analysis tool 102 of FIG. 1, or another configuration of hardware and/or software. In some embodiments, the method 310 is a sub-method of operation 204 of FIG. 2. In some embodiments, the method 310 is an alternative to the method 300 discussed above with respect to FIG. 3A.

Operation 312 includes comparing a selected portion of received code to entries in a lookup table, where the entries in the lookup table correspond to portions of code in the one or more repositories of code. Operation 314 includes determining if there is a match between the selected portion of the received code and any entry in the lookup table. If so, (314: YES), the method 310 proceeds to operation 316 and generates a score based on a frequency of the matching portion of code in the one or more repositories of code before returning to operation 312 and selecting another portion of the received code. For example, the generated score can be inversely related to the frequency of the matching portion of code in the one or more repositories of code. Said another way, a higher score can be generated for a matching portion of code that is relatively infrequent, whereas a lower score can be generated for a matching portion of code that is relatively more frequent.

If there is no match, (314: NO), then the method 310 proceeds to operation 318 and generates a score based on the lack of any match before returning to operation 312 and selecting another portion of the received code. In some embodiments, the score generated in operation 318 is larger than any score that can be generated by operation 316 insofar as operation 318 represents a unique portion of code whereas operation 316 indicates a match.

As can be seen in FIG. 3B, the method 310 provides a more granular approach to identifying rare code than the binary classifications used in the method 300 of FIG. 3A. By using scores rather than binary classifications, the method 310 of FIG. 3B may identify erroneous portions of code that would otherwise go unnoticed. For example, there may be errors in the one or more repositories of code, thus, a portion of code including an error in the received code may nonetheless find a match in the one or more repositories of code and thus be characterized as not rare. Nonetheless, the method 310 of FIG. 3B is a more computationally expensive strategy insofar as scores are calculated based on a frequency of each match rather than a binary classification.

Figure 4A:
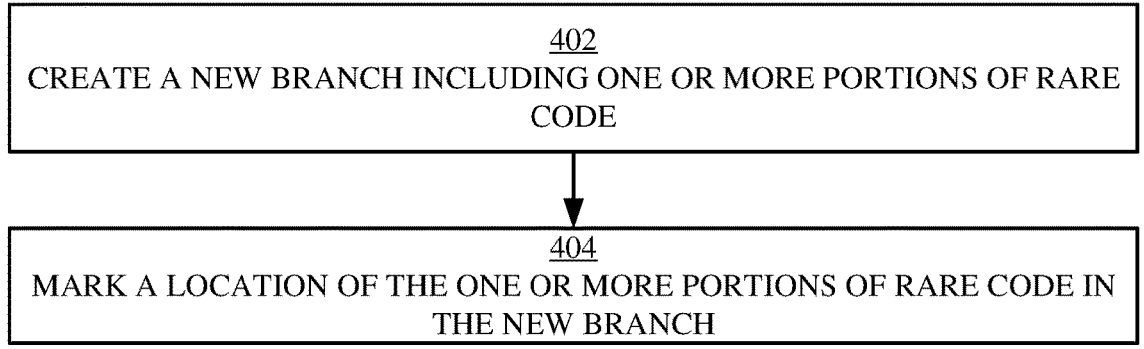
FIG. 4A illustrates a flowchart of an example method for annotating code, in accordance with some embodiments of the present disclosure.

FIG. 4A illustrates a flowchart of an example method 400 for annotating code, in accordance with some embodiments of the present disclosure. In some embodiments, the method 400 is implemented by a server, a computer, a processor, a virtual machine, the QL code analysis tool 102 of FIG. 1, or another configuration of hardware and/or software. In some embodiments, the method 400 is a sub-method of operation 206 of FIG. 2.

Operation 402 includes creating a new branch including one or more portions of rare code in the received code. In some embodiments, operation 402 leverages version control functionality associated with the received code to create a new branch. For example, operation 402 can utilize version control functionality related to branching and merging in Git. Advantageously, creating a new branch does not modify the master structure of the received code and can thus allow offline evaluation and/or modification of the rare code subsets identified in the newly created branch.

Operation 404 includes marking a location of the one or more portions of rare code in the new branch. The one or more portions of rare code can be marked by highlighting, commenting, flagging, editing, redlining, annotating, tagging, or another technique or strategy for marking the one or more portions of rare code.

Figure 4B:
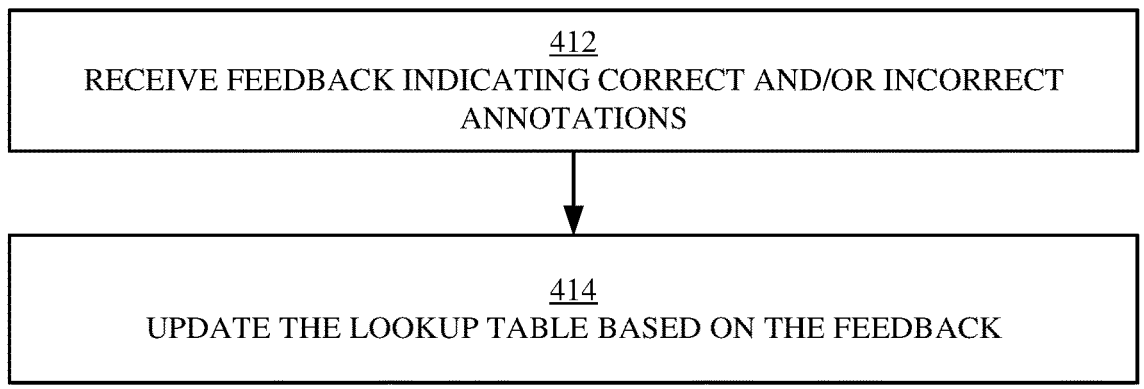
FIG. 4B illustrates a flowchart of an example method for receiving feedback, in accordance with some embodiments of the present disclosure.

FIG. 4B illustrates a flowchart of an example method 410 for receiving feedback, in accordance with some embodiments of the present disclosure. In some embodiments, the method 410 is implemented by a server, a computer, a processor, a virtual machine, the QL code analysis tool 102 of FIG. 1, or another configuration of hardware and/or software. In some embodiments, the method 410 is a sub-method of operation 208 of FIG. 2.

Operation 412 includes receiving feedback indicating correct and/or incorrect annotations. Feedback can be received from a testing platform. For example, the feedback can be generated by a SME performing review of the annotated code on the testing platform. In some embodiments, the feedback includes, for every identified portion of rare code, whether the identified portion of rare code corresponded to an error or other issue.

Operation 414 includes updating the lookup tables based on the feedback. For example, for a false positive (e.g., a portion of code identified as rare that did not correspond to an error in the received code), the portion of rare code can be added to a lookup table so that it is no longer identified as rare code. For a false negative (e.g., a detected error that was not annotated as rare code since it matched a portion of code in the one or more repositories of code), the detected error can be removed from the lookup table so that further instances of the detected error are annotated as rare code.

As will be appreciated by one skilled in the art, other methods can be employed for incorporating feedback into the rare code detection model. For example, artificial intelligence (AI) strategies such as reinforcement learning can be employed to implement feedback and improve the rare code detection model.

Figure 5:
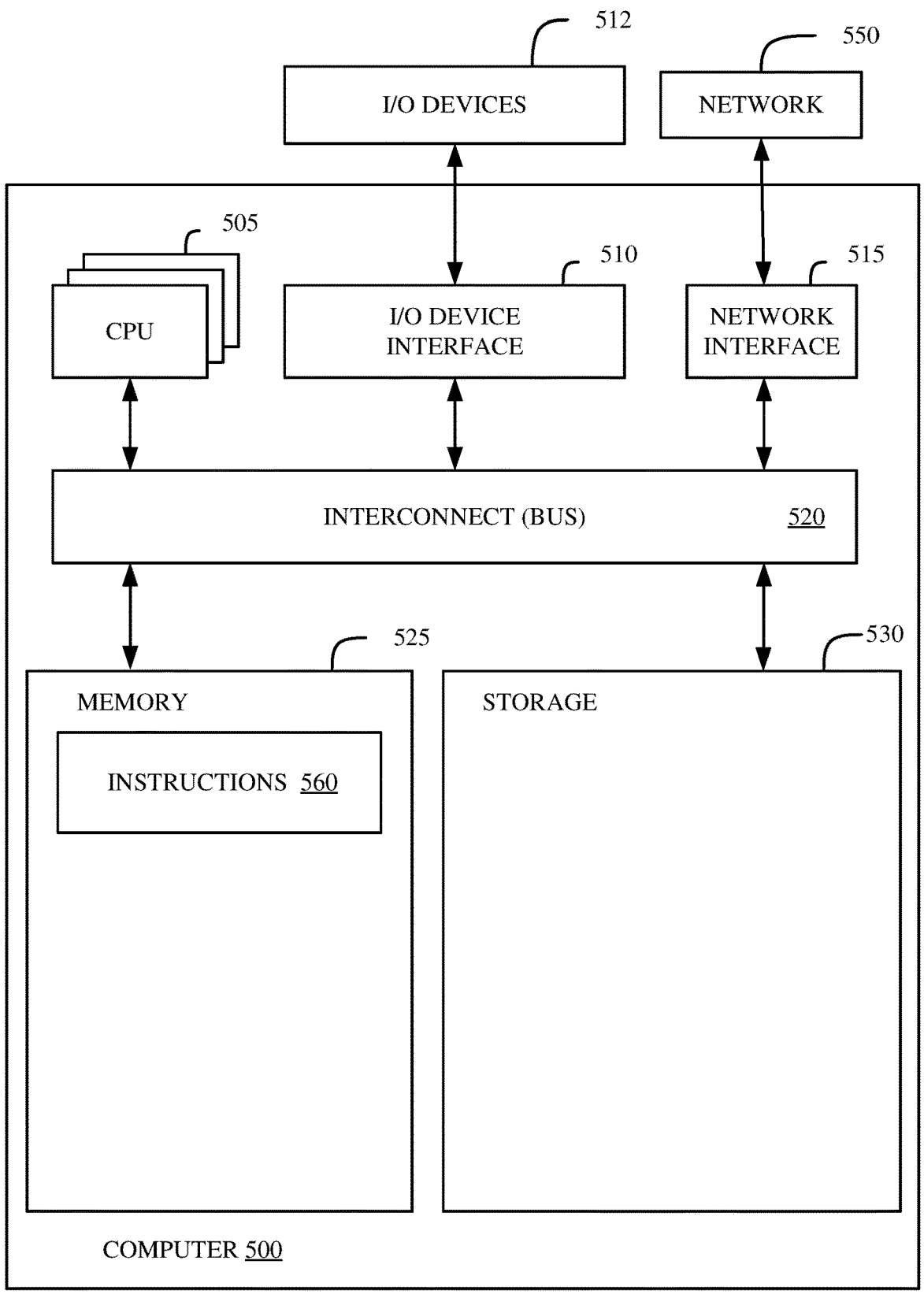
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described in FIGS. 2-4 and/or implement the functionality discussed in FIG. 1. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) one or more entities of the computational environment (e.g., QL code analysis tool 102, one or more repositories of code 118, testing platform 120, etc.) and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 2-4 and/or implementing the functionality discussed in any portion of FIG. 1. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
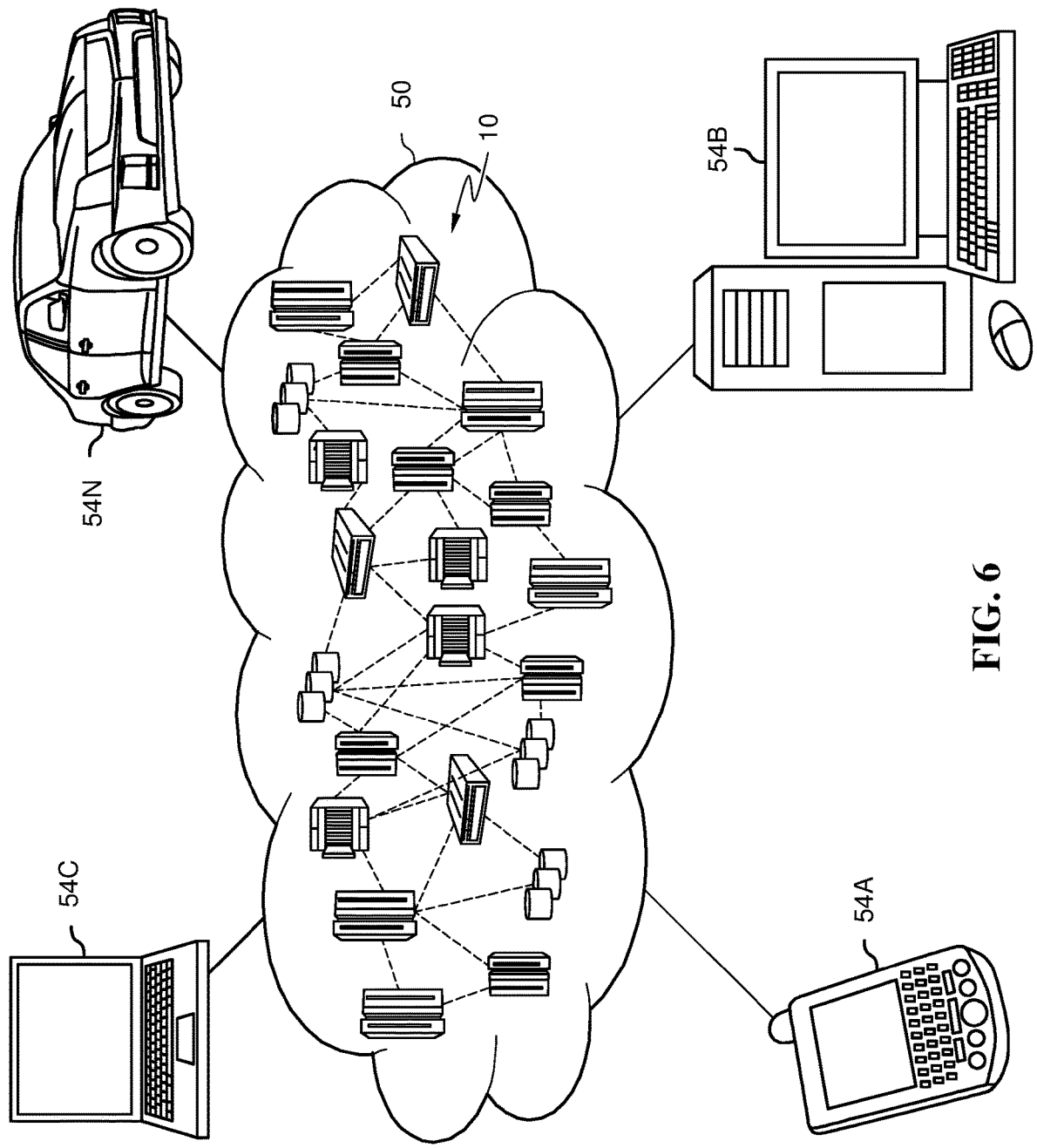
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
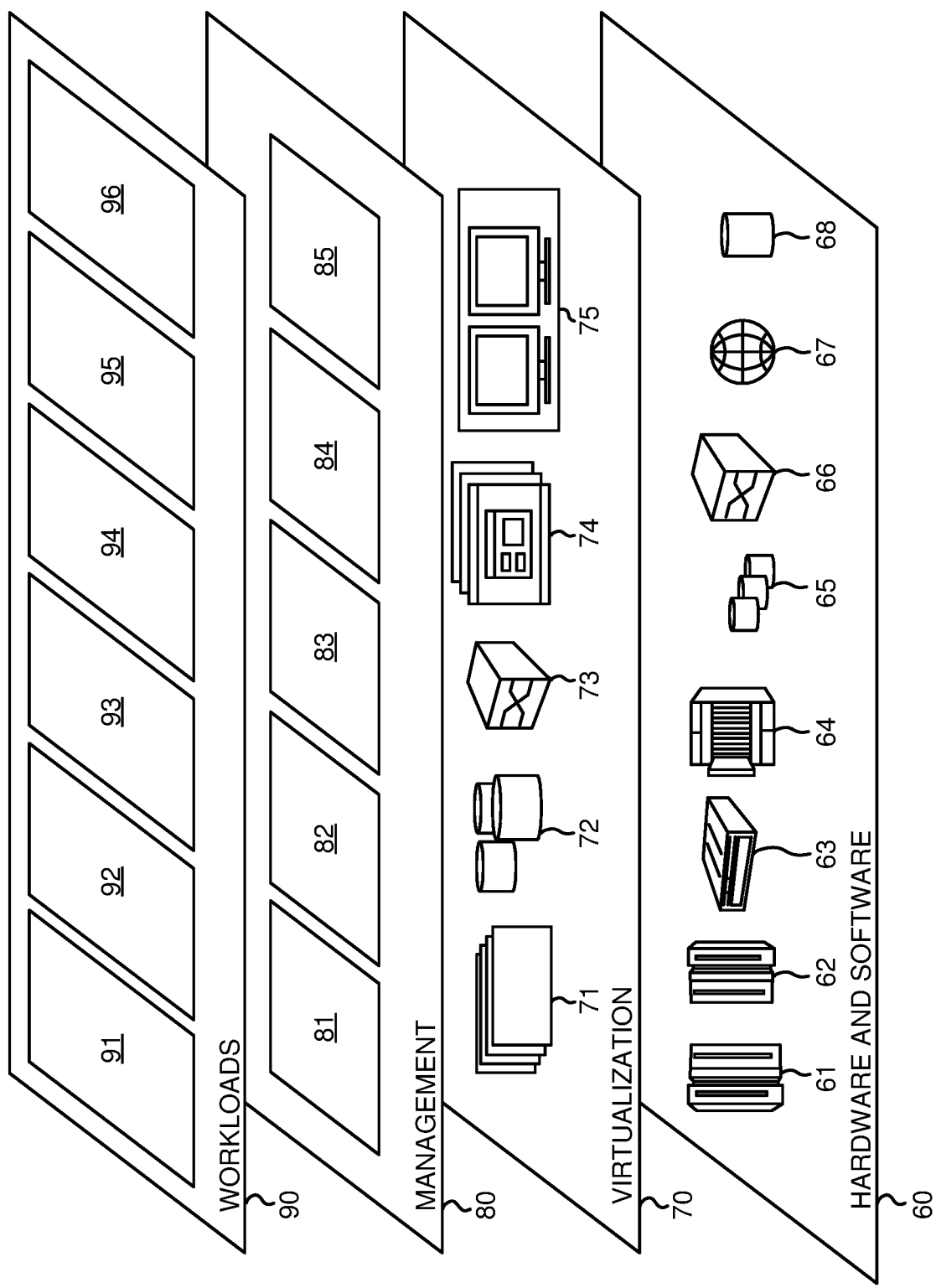
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code review using Quantitative Linguistics (QL) 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described with respect to FIGS. 2-4 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes comparing received code to one or more repositories of code; identifying one or more portions of rare code in the received code that satisfy a rarity threshold relative to the one or more repositories of code; generating annotated code by annotating the received code at the one or more portions of rare code; and transmitting the annotated code to a testing platform.

Example 2 includes the method of example 1, including or excluding optional features. In this example, the one or more portions of rare code do not match any portion of code in the one or more repositories of code.

Example 3 includes the method of any one of examples 1 to 2, including or excluding optional features. In this example, the one or more portions of rare code match a portion of code in the one or more repositories of code that is associated with a frequency below a threshold. Optionally, the frequency is based on a number of times the portion of code appears in the one or more repositories of code. Optionally, the frequency is based on a percentile rank of the portion of code relative to frequencies of other portions of code in the one or more repositories of code.

Example 4 includes the method of any one of examples 1 to 3, including or excluding optional features. In this example, identifying the one or more portions of rare code in the received code utilizes a cached lookup table storing portions of the one or more repositories of code.

Example 5 includes the method of any one of examples 1 to 4, including or excluding optional features. In this example, identifying the one or more portions of rare code is performed using memoization.

Example 6 includes the method of any one of examples 1 to 5, including or excluding optional features. In this example, generating annotated code further comprises: creating a new branch including the one or more portions of rare code; and marking a location of the one or more portions of rare code in the new branch.

Example 7 includes the method of any one of examples 1 to 6, including or excluding optional features. In this example, the method includes receiving feedback related to a correctness of the annotated code; and modifying weights of portions of code in the one or more repositories of code based on the correctness.

Example 8 includes the method of any one of examples 1 to 7, including or excluding optional features. In this example, the method includes receiving feedback indicating a false positive, wherein the false positive identifies a portion of annotated code; and adding the portion of annotated code to a lookup table associated with the one or more repositories of code.

Example 9 includes the method of any one of examples 1 to 8, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 10 is a system. The system includes one or more processors and one or more computer-readable storage media storing program instructions which, when executed by the one or more processors, are configured to cause the one or more processors to perform a method according to any one of examples 1 to 9.

Example 11 is a computer program product. The computer program product includes one or more computer readable storage media, and program instructions collectively stored on the one or more computer readable storage media, the program instructions comprising instructions configured to cause one or more processors to perform a method according to any one of examples 1 to 9.

What is claimed is:

1. A computer-implemented method comprising:
   comparing received code to one or more repositories of code;
   identifying one or more portions of rare code in the received code, wherein the one or more portions of rare code match a portion of code in the one or more repositories of code that is associated with a percentile rank below a rarity threshold, wherein the percentile rank is based on a frequency of the portion of code relative to frequencies of other portions of code in the one or more repositories of code, and wherein the frequency indicates a number of times the respective portion of code appears in the repository of code;
   generating annotated code by annotating the received code at the one or more portions of rare code; and
   transmitting the annotated code to a testing platform in order to automatically test the one or more portions of rare code.

2. The method of claim 1, wherein identifying the one or more portions of rare code in the received code utilizes a cached lookup table storing portions of the one or more repositories of code.

3. The method of claim 1, wherein identifying the one or more portions of rare code is performed using memoization.

4. The method of claim 1, wherein generating annotated code further comprises:
   creating a new branch including the one or more portions of rare code; and
   marking a location of the one or more portions of rare code in the new branch.

5. The method of claim 1, further comprising:
   receiving feedback related to a correctness of the annotated code; and
   modifying weights of portions of code in the one or more repositories of code based on the correctness.

6. The method of claim 1, further comprising:
   receiving feedback indicating a false positive, wherein the false positive identifies a portion of annotated code; and
   adding the portion of annotated code to a lookup table associated with the one or more repositories of code.

7. The method of claim 1, wherein the method is performed by one or more computers according to software that is downloaded to the one or more computers from a remote data processing system.

8. The method of claim 7, wherein the method further comprises:
   metering a usage of the software; and
   generating an invoice based on metering the usage.

9. A system comprising:
   one or more processors; and
   one or more computer-readable storage media storing program instructions which, when executed by the one or more processors, are configured to cause the one or more processors to perform a method comprising:
   comparing received code to one or more repositories of code;
   identifying one or more portions of rare code in the received code, wherein the one or more portions of rare code match a portion of code in the one or more repositories of code that is associated with a percentile rank below a rarity threshold, wherein the percentile rank is based on a frequency of the portion of code relative to frequencies of other portions of code in the one or more repositories of code, and wherein the frequency indicates a number of times the respective portion of code appears in the repository of code;
   generating annotated code by annotating the received code at the one or more portions of rare code; and
   transmitting the annotated code to a testing platform in order to automatically test the one or more portions of rare code.

10. The system of claim 9, wherein identifying the one or more portions of rare code in the received code utilizes a cached lookup table storing portions of the one or more repositories of code.

11. The system of claim 9, wherein identifying the one or more portions of rare code is performed using memoization.

12. The system of claim 9, wherein generating annotated code further comprises:
   creating a new branch including the one or more portions of the received code; and marking a location of the one or more portions of the received code in the new branch.

13. The system of claim 9, further comprising:
receiving feedback related to a correctness of the annotated code; and
modifying weights of portions of code in the one or more repositories of code based on the correctness.

14. A computer program product comprising one or more non-transitory computer readable storage media, and program instructions collectively stored on the one or more non-transitory computer readable storage media, the program instructions comprising instructions configured to cause one or more processors to perform a method comprising:
comparing received code to one or more repositories of code;
identifying one or more portions of rare code in the received code, wherein the one or more portions of rare code match a portion of code in the one or more repositories of code that is associated with a percentile rank below a rarity threshold, wherein the percentile rank is based on a frequency of the portion of code relative to frequencies of other portions of code in the one or more repositories of code, and wherein the frequency indicates a number of times the respective portion of code appears in the repository of code;
generating annotated code by annotating the received code at the one or more portions of rare code; and
transmitting the annotated code to a testing platform in order to automatically test the one or more portions of rare code.

* * * * *